Figure 1:
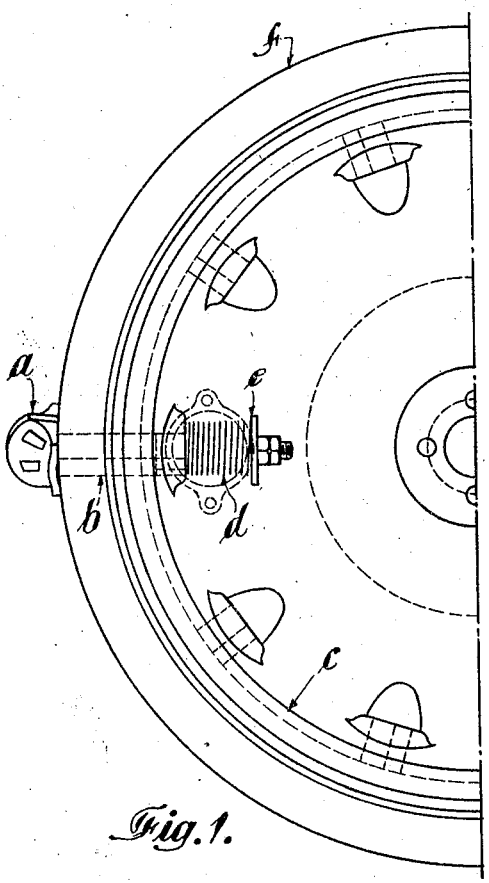

Aug. 31, 1926.  
W. L. HILL  
1,598,278  
MOTOR TRACTOR WHEEL AND THE LIKE  
Filed April 27, 1925

Inventor:  
Walter L. Hill  
By his Attorney: Walter Gunn

Patented Aug. 31, 1926.

1,598,278

UNITED STATES PATENT OFFICE.

WALTER LLEWELYN HILL, OF MANCHESTER, ENGLAND.

MOTOR TRACTOR WHEEL AND THE LIKE.

Application filed April 27, 1925, Serial No. 26,280, and in Great Britain May 3, 1924.

This invention refers to motor tractor wheels and the like having a plurality of tyres and relates to the method of applying "cleats" to same for the purpose of running over soft ground.

Hitherto the cleats have been arranged at one side of the wheel and rigidly fixed to a drum-like flange, the outer working edges of the cleats lying in a circle slightly less than the outer circumferences of the rubber tyres. With such disposition of the cleats and with the tyres very hard, the tyres do not allow the cleats to properly engage the ground and locomotion is unsatisfactory. On the other hand, when the tyres become worn, and the wheels are required to travel over hard ground, the cleats meet the ground and nullify the benefits of the rubber tyres.

The object of this invention is to apply cleats to the wheels in a manner which allows of the fullest advantages of said cleats being obtained when required for use, and which also allows of the cleats, when not required, being retracted or moved to a position where they do not interfere with the proper use of the tyres, while still remaining on the wheels.

A further object of the invention is a construction of single tractor wheel provided with two tyres and fitted with the improved arrangement of cleats.

According to the invention, the cleats which may be of the usual T section or which may be V or other suitable shape, are arranged (transversely or diagonally) across the peripheries of the rubber tyres and are secured in said position and to the rim of the wheel by an arrangement of fastening or anchoring means which allows of the cleats when no longer needed being readily removed from the peripheries of the tyres and caused to lie out of the way between the tyres.

In one example of the invention, each tractor wheel which is formed with a hollow flat-faced rim and fitted with two solid rubber tyres, is provided with holes at intervals around the rim and centrally between the tyres. Through such holes pass bolts each of which at one end is integral with or connected to a cleat, while at its other end, inside the rim, each bolt is provided with a spring and washer (or washers) and nut or nuts, whereby the cleat may be adjusted to lie in the annular space between the tyres or across the treads of the tyres, the spring holding the cleat tightly and yieldingly against the tyres when lying across same, or against the rim when lying between the tyres. That part of each cleat bolt next the cleat is made other than round in shape, as also the hole in the rim, the other portion of the bolt being round, so that when drawn out the bolt and cleat can be rotated to one of two positions, i. e., across the tyres, or between the tyres, and in either position be firmly held against accidental disturbance. Usually the wheel rim, will have an opening on the side to allow access to the nut and bolts.

The wheel may be built up of two single wheels, but it will preferably consist of a single wheel with two tyres, the rim being widened to suit.

Upon the accompanying drawings:—

Fig. 1 is a side elevation.

Figure 2:
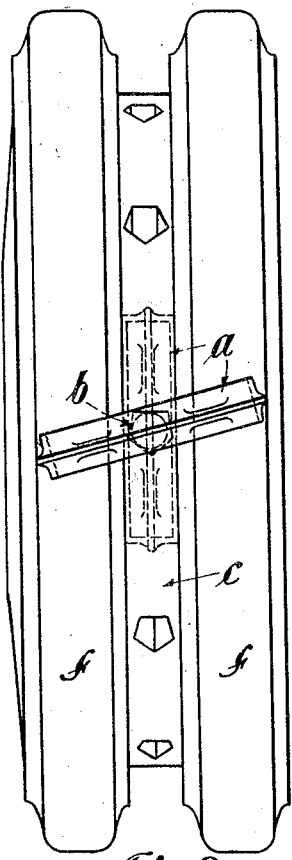

Fig. 2 an edge view, and

Figure 3:
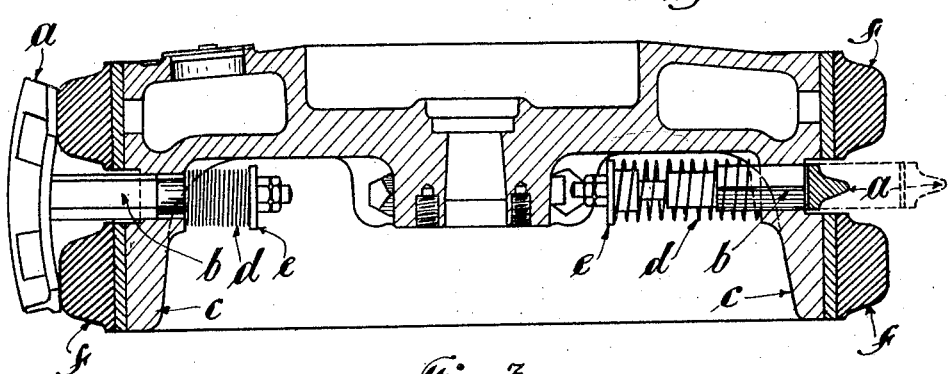

Fig. 3 a sectional view of part of a motor tractor wheel with the invention applied thereto.

In the example of wheel shown, provision is made for the wheel to be fitted with ten cleats, but two only are shown, one lying across the peripheries of the tyres and the other lying in the channel between the tyres.

$a, a$ are the cleats, and $b, b$ the bolts connected with same and slidable in holes in the wheel rim or rim extension. $c, d$ is the spring and $e$ the washer for each cleat bolt. The holes in the rim $c$ are preferably pentagonal in shape, and while the outer part of each bolt is of corresponding shape, the inner part is round. When pulled out of the channel as shown by dotted lines in Fig. 3, the cleats can be rotated to lie across the tyres $f, f$ the springs tightly holding the same against the tyres. On again drawing out and rotating the cleats until they come into line with the channel, the springs draw them into the channel and hold them firmly therein.

By making the holes and bolts hexagonal in shape they will allow of the cleats being placed either transversely or diagonally across the tyres.

In addition to holding the cleats to the tyres or rim, the springs serve to compensate for any wear or compression of the tyres.

The wheel is preferably made hollow to allow of being fitted with metal turnings or the like for the purpose of weighting the wheel.

Although chiefly for use with wheels having two tyres (solid or pneumatic) the invention may also be applied to wheels having more than two tyres.

What I claim is:—

1. A motor tractor or like wheel comprising a wheel rim, a plurality of tyres on said rim, holes in said rim between the tyres, cleats attached to said rim, through the holes, and capable of lying between the two tyres or across the tyres.

2. A motor tractor or like wheel, comprising a wheel rim, a plurality of tyres on said rim, holes in said rim, between the tyres, and of other than round shape, cleats normally lying between the tyres, bolts on said cleats, of other than round cross section for a part of their length slidably passing through and fitting said holes, nuts and washers on the free ends of said bolts, and coiled springs surrounding said bolts, and acting between said nuts and washers and the inner face of said rim, whereby the cleats are firmly but yieldingly held against the rim between the tyres, but capable of being drawn out and turned to a position across the peripheries of the tyres.

In testimony whereof I have signed my name to this specification.

WALTER LLEWELYN HILL.